April 18, 1961 P. V. JOHNSON ET AL 2,980,265
TRANSFER CRANE
Filed June 19, 1957 6 Sheets-Sheet 2
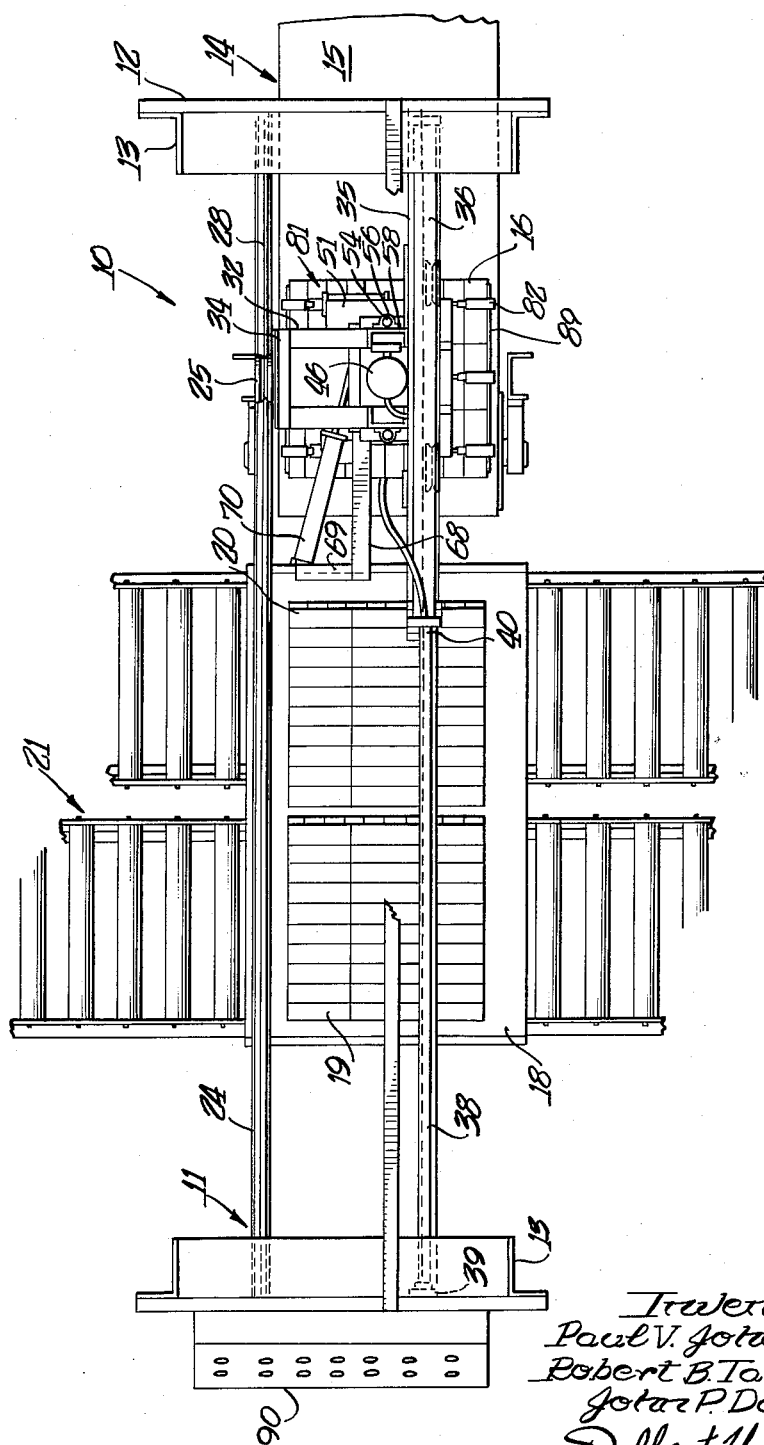
Inventors
Paul V. Johnson
Robert B. Taylor
John P. Duane
Dalbert U. Shefte
Attorney

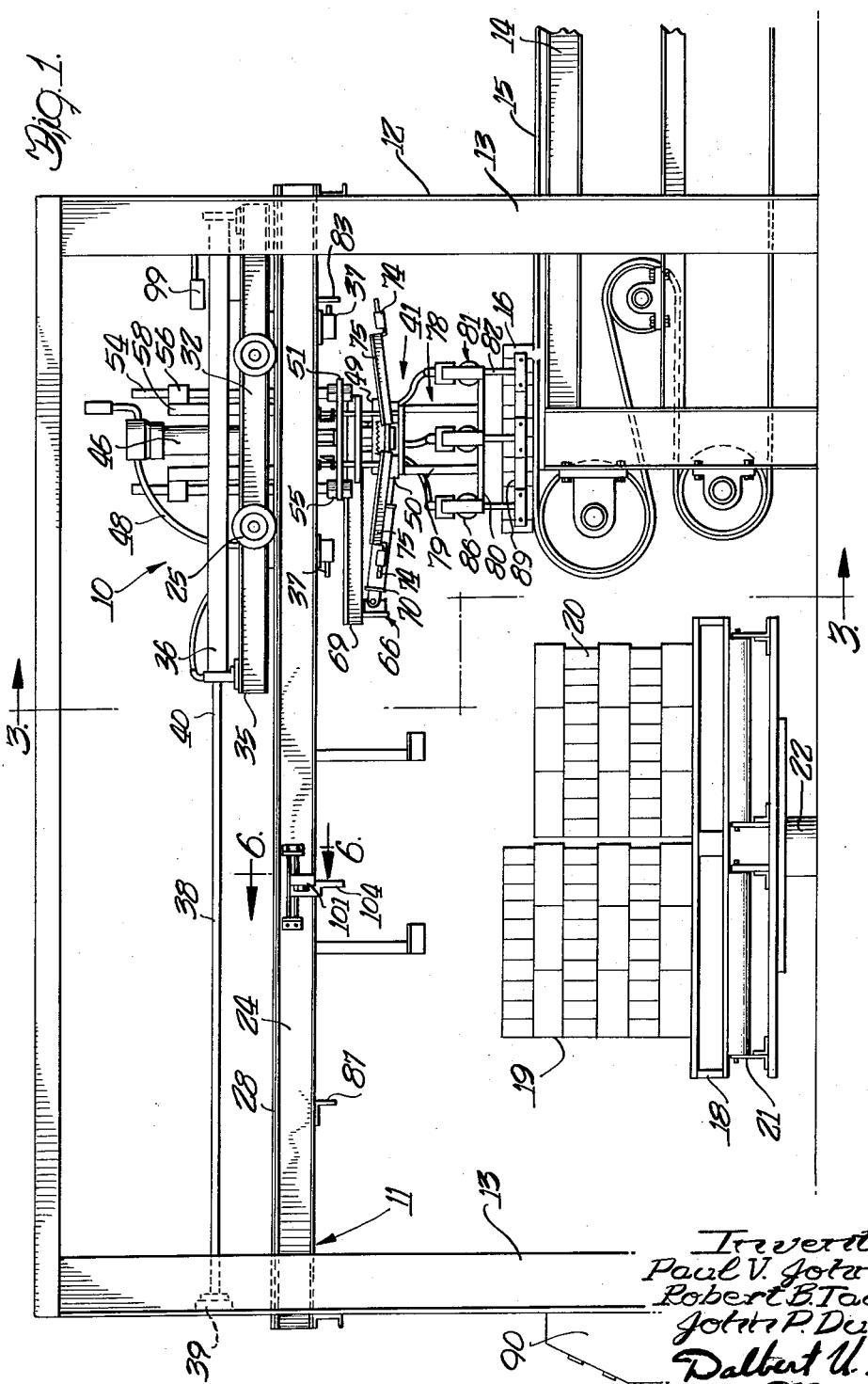

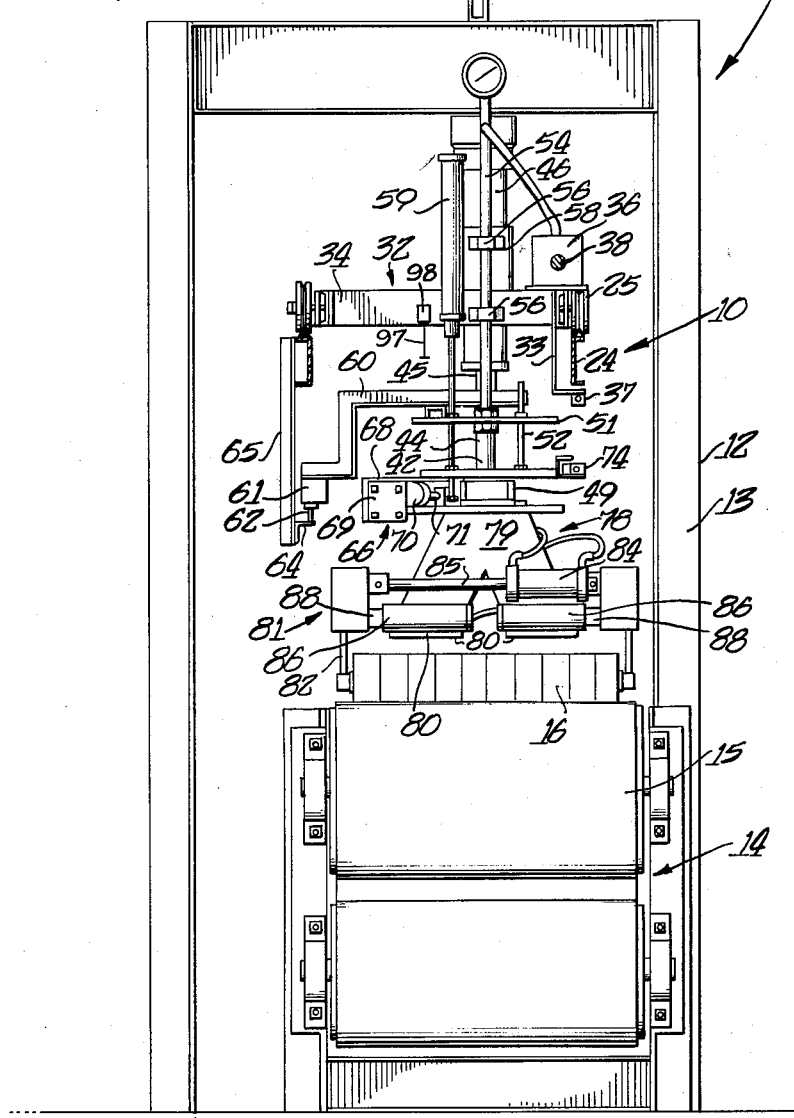

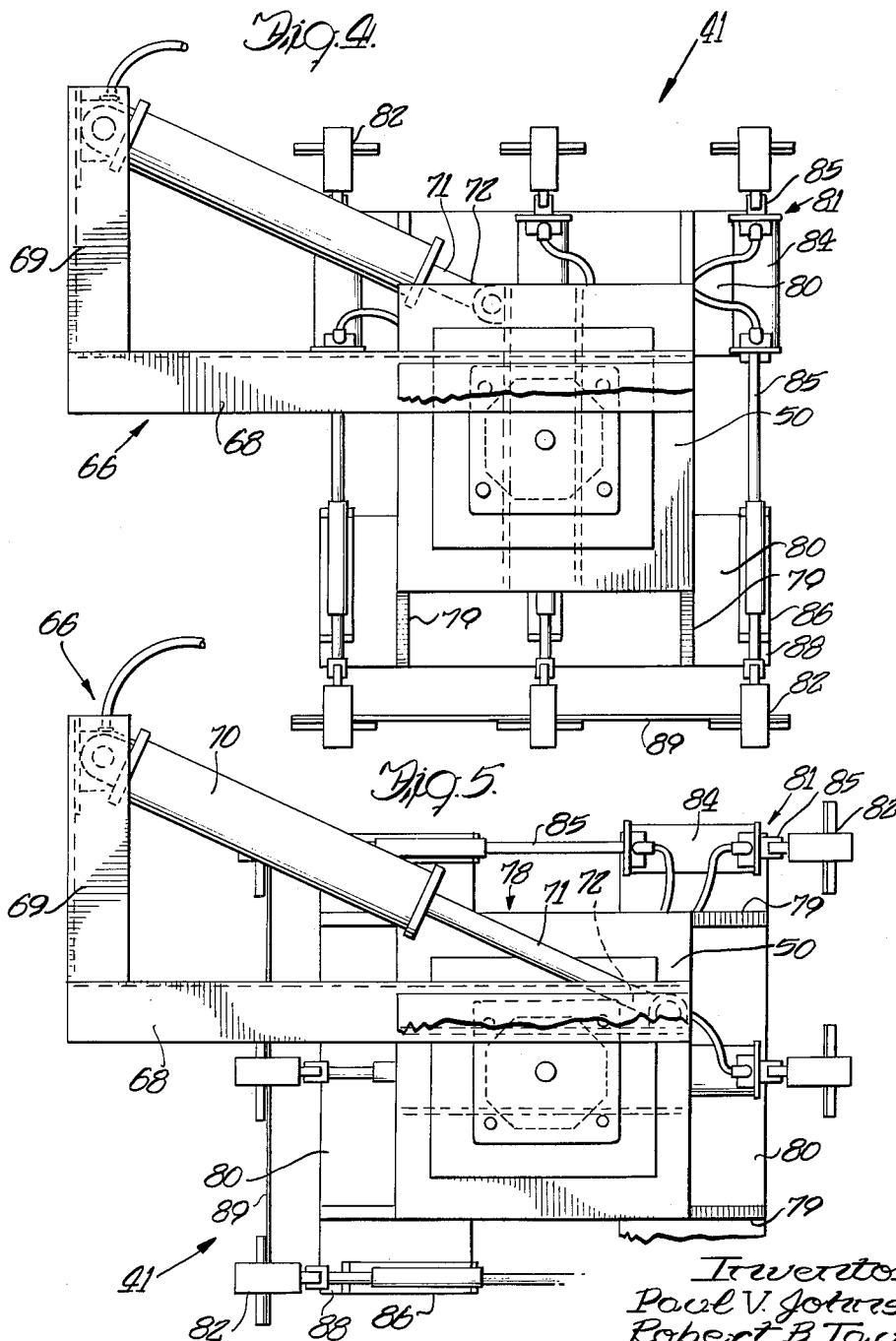

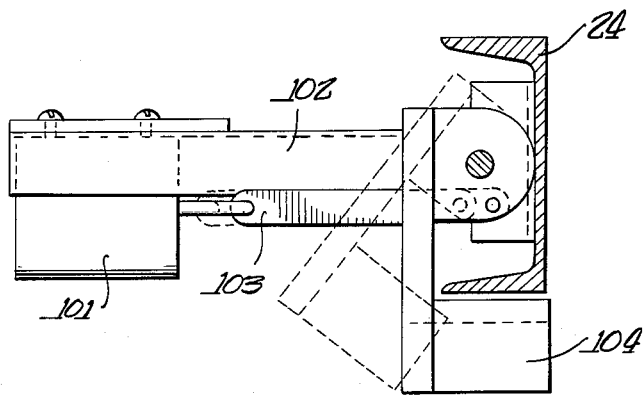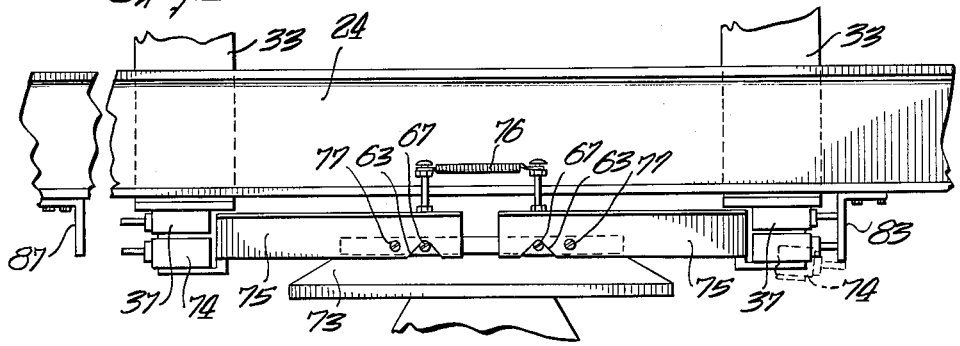

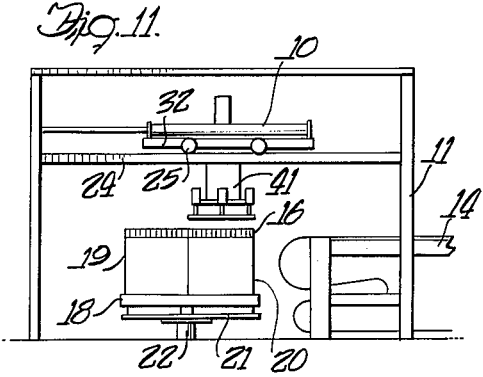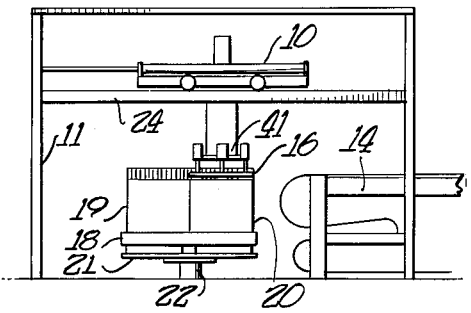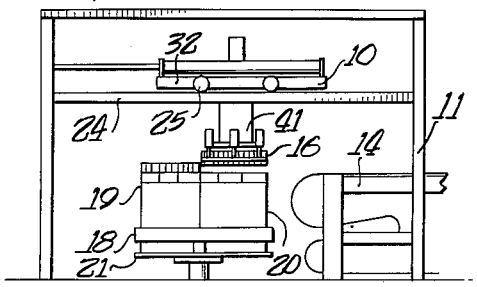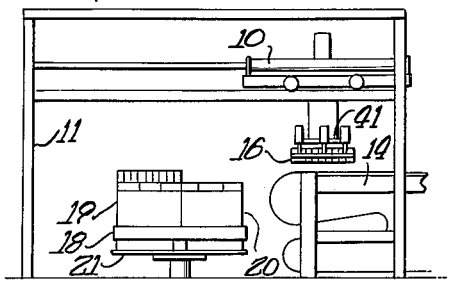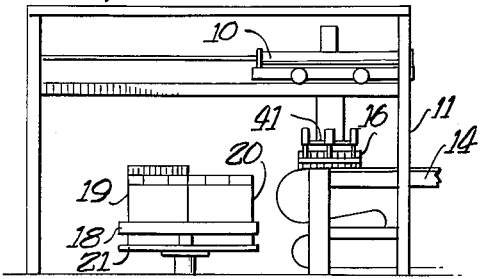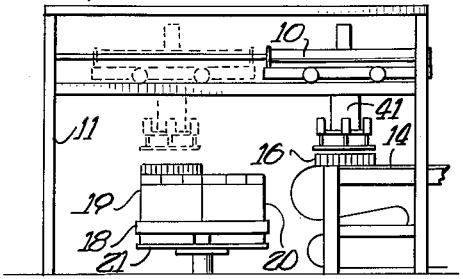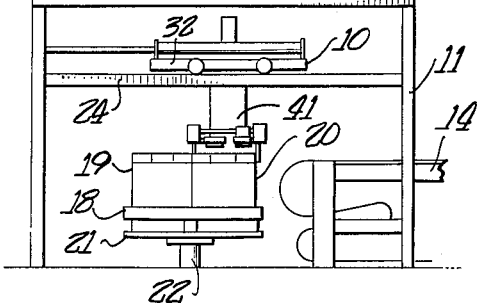

United States Patent Office 2,980,265
Patented Apr. 18, 1961

2,980,265

TRANSFER CRANE

Paul V. Johnson, Geneva, Robert B. Taylor, Elmhurst, and John P. Dunne, Chicago, Ill., assignors to Structural Clay Products Research Foundation Filed June 19, 1957, Ser. No. 667,070

5 Claims. (Cl. 214—1)

This invention relates to a transfer crane and more particularly to a transfer crane which transfers units from one point to another and can pivot while so doing to position the units as desired.

In the development of materials handling and production line equipment, one of the aims is to eliminate or reduce the labor necessary to perform a required operation and where possible to replace manual operations by mechanical substitutes. One of the most difficult of these mechanization problems is found in the area of transferring objects where they must be turned so as to face a different direction after transfer. The problem is apparent and even more complex where units are to be transferred from stacks having alternate layers facing in different directions and it is desired that the units be loaded onto the conveyor with all units facing the same direction.

The present invention was developed to overcome such a problem in the structural clay products industry. A package for brick or other structural clay units has been developed by the Structural Clay Products Research Foundation and is disclosed in U.S. Letters Patent No. 2,778,491, issued January 22, 1957. In order to economically prepare such a package the Structural Clay Products Research Foundation has developed an automatic packaging line which accumulates and straps units to form such a package. The line is disclosed in the copending patent application Serial No. 667,069, filed June 19, 1957, now Patent No. 2,961,810.

One of the elements required to fully mechanise this packaging line is a transfer crane or similar device for initially loading units onto the line. The difficulty in providing such a device is obvious when it is realized that brick and similar units are normally transported on pallets with the brick stacked in cubes having alternate courses of the cubes facing 90° from the facing of adjacent courses so as to give stability to the cube and reduce the danger of the cube falling apart. A pallet loaded with brick in this manner is shown in Fig. 1. The brick or other units must be transferred onto the line with all the brick or units aligned to face in the same direction for further operations by the packaging line. Thus, the transfer must not only perform the operation of taking courses of units from the cube and placing them on the line but must also include the pivoting of alternate courses so that all units will be facing alike on the line.

The transfer crane of the present invention provides a solution to the above problem. The transfer crane moves on a track from the pallet to the line and has a pickup assembly which is lowered to pick up and discharge a course of brick. The pickup assembly is pivotally mounted so that it can be pivoted 90° to align alternate courses with preceding and succeeding courses. Further, the present transfer crane operates at two pickup positions so as to simultaneously unload two cubes of units from a single pallet.

The principal object of the present invention is to provide a new and improved transfer crane for transferring units from one location to another.

Another object of the present invention is to provide a new and improved transfer crane for transferring units from one location to another which can pivot the units in a horizontal plane as they are being transferred.

A further object of the present invention is to provide a new and improved transfer crane having a pickup assembly which is vertically movable to perform the pickup and discharge operations and is pivotally movable so that it can pivot units while the units are being transferred.

Still another object of the present invention is to provide a new and improved transfer crane for transferring units which are stacked in courses with alternate courses facing perpendicular to the facing of adjacent courses, the transfer crane automatically turning the alternate courses so as to discharge each course with the result that all discharged units will be facing in the same direction.

A still further object of the present invention is to provide a new and improved automatic transfer crane having two pickup positions so that it can pickup and unload two stacks of units simultaneously, the crane operating alternately from one pickup position and then the other.

Yet another object of the present invention is to provide a new and improved transfer crane having movable clamping tongs thereon capable of firmly clamping a course which may be out of alignment before moving the course back into alignment thereby avoiding disturbance of the arrangement of the units.

Yet a further object of the present invention is to provide a new and improved transfer crane having a pair of clamping tongs interconnected to a single operating power source so that when one tong contacts a course that is out of alignment it will not move until the other tong has also engaged the course and the course is firmly clamped between the tongs for subsequent movement into alignment and transfer by the crane.

And another object of the present invention is to provide a new and improved transfer crane having a pair of movable clamping tongs secured to pistons interconnected to a single pneumatic source for operation so that when one of the tongs contacts a course which is out of alignment it will not move until the other tong has moved into engagement with the course to firmly clamp the course between the tongs after which the tongs move the course into alignment for subsequent transfer by the crane.

Other and further objects and features of the present invention will be apparent from the following description and drawings of which:

Fig. 1 is a side elevational view of one embodiment of a transfer crane according to the present invention and including the end of a conveyor line and a pallet loaded with brick;

Fig. 2 is a top plan view of the device of Fig. 1;

Fig. 3 is a vertcal sectional view taken along line 3—3 of Fig. 1;

Fig. 4 is a top plan view of the pickup assembly of the device shown in Fig. 1;

Fig. 5 is a view similar to Fig. 4 showing the pickup assembly pivoted through 90°;

Fig. 6 is a vertical sectional view taken along line 6—6 of Fig. 1;

Fig. 7 is an enlarged side elevational view of a portion of the device of Fig. 1 illustrating the position of switches with the pickup assembly in the raised position;

Fig. 8 is a vertical sectional view of the roller and track structure of the device of Fig. 1;

Fig. 9 is a side elevational view of one of the switch arrangements of the structure of Fig. 1;

Fig. 10 is a top plan view of the structure illustrated in Fig. 9;

Figs. 11–17 are diagrammatic side elevational views illustrating the various operating positions of the device of Fig. 1.

While this invention is susceptible of embodiments in many different forms there is shown in the drawings and will herein be decribed in detail several embodiments with the understanding that the present disclosure is to be considered as an exemplification of the principles of the invention and is not intended to limit the invention to the embodiment illustrated. The scope of the invention will be pointed out in the appended claims.

As seen in Figs. 1 and 2, a transfer crane 10 is shown movably mounted on a supporting structure 11 for movement between the vertical legs 13 of the supporting structure. The forward end 12 of the supporting structure 11 positioned so as to overlap a conveyor system 14 or other structure upon which it is desired to place units transferred by the crane 10. The particular conveyor system 14 shown in the drawings has a continuous belt 15 which conveys the discharged courses 16 away from the transfer crane 10.

Pallets 18 loaded with cubes 19 and 20 or brick or other similar units are positioned between the legs 11 so as to be below the transfer crane 10 when in a pickup position and as seen in Fig. 1, there are two cubes 19 and 20 mounted on the pallet 18 which thus require the transfer crane 10 to move from two pickup positions. The pallets 18 are movable on a system of rollers 21 and when located below the transfer crane 10, the pallet and rollers are intermittently raised by a piston 22 so as to raise the succeeding course of brick to the level of the previously removed course so that upon return of the crane the top course is in position to be picked up by the crane.

A pair of parallel tracks 24 are horizontally secured to the legs 13 of the supporting structure 11 to support and guide the wheels 25 of the transfer crane 10. Figure 8 shows a sectional view of the track and wheel construction which shows the track consisting of an inverted V-bar 28 mounted on the top 29 of a C-channel 26. The wheel 25 has an annular notch 30 formed in its outer surface shaped to mate with the V-bar 28 and is mounted on an axle 31 which is secured to the carriage 32 of the transfer crane 10.

The carriage consists of a rectangular frame 34 with an elongated side 35 parallel to one of the channels 26. A long cylinder 36 is mounted on the elongated side 35 parallel to the channel 26 and a piston 38 is slideably mounted in the cylinder 36 with one end 39 secured to a rear leg 13 of the supporting structure 11 and its other end 40 mounted within the cylinder 36. This cylinder-piston mechanism is pneumatically operated and acts as the driving mechanism for moving the transfer crane 10 along the tracks 24. The length of the cylinder 36 is seen to be of considerable length, it must be long enough to permit movement of the transfer crane from the discharge position to the pickup position above the farthest cube 19.

A pair of oppositely facing micro switches 37 are attached to extensions 33 of the carriage. These extensions 33 position the carriage switches 37 directly below the track 24 so as to engage contacts 83 and 87 depending from the tracks 24 and the intermediate stop 104 explained below. The contact 83 is at the discharge position, the contact 87 at the farthest pickup position and the intermediate stop 104 at the nearest pickup position. The function and operation of these carriage switches 37 will be described below.

The carriage 32 provides an overhead support for a pickup assembly 41. The assembly 41 has a channel shaped cross-piece 49 which is mounted on the outer end 42 of the piston 44. The other end 45 of the piston 44 is slideable within a vertical cylinder 46 mounted on the rectangular frame 34 of the carriage 32. This piston-cylinder mechanism serves as the primary means of supporting the pickup assembly 41 from the carriage 32. The cylinder 46 is pneumatically operated, being supplied with air under pressure from a source (not shown) through the hose connection 48 to raise and lower the pickup assembly 41.

The piston 44 is freely rotatable in the cylinder 46 and thus the cross piece 49 is rotatable in a horizontal plane. A mounting plate 50 is seated on top of the cross piece 49 and surrounds the piston 44. The mounting plate 50 is not secured to the cross piece 49 and therefore is not rotatable therewith. A top plate 51 is mounted above the mounting plate 50 and is spaced therefrom by vertical spacer bars 52 extending therebetween. The top plate 51 surrounds the piston 44 but is not attached thereto for rotation. A pair of guide rods 54 having their lower ends 55 secured to the top plate 51 extend upwardly into bushings 56 mounted on the rectangular frame 34 and on flanges 58 that extend above the frame 34. These rods 54 serve the dual purpose of guiding the vertical motion of the top plate 51 and preventing horizontal pivotal movement.

A pair of snubbers 59 are secured to the rectangular frame 34 and the top plate 51. These snubbers may be of any commercial type such as the construction sold by Bellows Co. and called "hydrochecks." These hydrochecks are hydraulic oil filled cylinders and serve to cushion the downward movement of the pickup assembly 41 to prevent jarring of the crane.

A switch mounting arm 60 is secured to the top plate 51 and extends to the side for supporting a set of four downwardly facing mounting plate micro switches 61. These micro switches 61 have depending contacts 62 which when the pickup assembly 41 is lowered engage a contact 64 attached to a bracket 65 extending downwardly from the track 24. As seen in Figures 1 and 3, similar brackets 65 are mounted adjacent the discharge location of the transfer crane and adjacent the two pickup locations. The arm 60, as seen in Fig. 3, is shaped to accommodate the track 24 when the pickup assembly 41 is in the raised position.

The mounting plate 50 also supports a turning mechanism 66 which includes a horizontal mounting arm 68 having an outer end 69 to which is attached a cylinder 70. A piston 71 is slideably mounted in the cylinder 70 and its outer end 72 is secured to the cross piece 49. The cylinder is pneumatically operated so as to slide the piston back and forth thereby imparting pivotal motion to the cross piece 49. The stroke of the piston is regulated so as to move the cross piece 49 through an arc of 90°.

Also mounted on the mounting plate 50 are a pair of pivotally mounted micro switches 74 which are attached to the ends of brackets 75. These brackets are parallel to one of the tracks 24 and are positioned directly below the track. The brackets 75 are mounted on pins 77 extending from a flange 73 on the top of the mounting plate 50. A spring 76 interconnects the brackets 75 and normally urges them into a raised position as shown in Figure 1. Stop pins 67 extending from the flange 73 engage notches 63 in the brackets 75 to position the spring urged brackets 75 in a substantially horizontal plane. These pivotally mounted switches 74 engage the contacts 83 and 87 and the intermediate stop 104 below the track 24. The function and operation will be described below.

A framework 78 is secured to the cross piece 49 and extends downwardly therefrom. The framework 78 has flat side plates 79 each shaped in an inverted V. Bottom plates 80 are secured to and interconnect the corresponding ends of the side plates. These bottom plates 80 also serve as supports for the clamping mechanism 81.

The clamping mechanism 81 consists of 3 pairs of unit engaging tongs 82 mounted parallel to each other. The movement of each pair of tongs 82 is controlled by a single cylinder 84 having two pistons 85, one piston extending from each end of the cylinder 84. These pistons 85 are mounted to the tongs 82 so that movement of the pistons 85 in the cylinder 84 will cause the tongs 82 to move into or out of clamping position. The cylinder 84 is not secured to any adjacent structure except the tongs 82 and is a single chamber cylinder with pressure forcing the pistons 85 together so that if one tong 82 encounters resistance, such as when a course of units is out of alignment, that tong will remain fixed but the other tong will continue to move into clamping position out of alignment. This type of clamping is important to prevent the disrupting of units in the course that is out of alignment and prevents the possible breakdown of the entire cube of units.

When a course of units that is out of alignment has been clamped as described above, it must then be moved into alignment for proper discharge onto the conveyor belt 15. This is accomplished by a pair of sealed positioning cylinders 86 of equal pressure. The cylinders 86 are mounted in line on the bottom plates 80 (Fig. 3) and have pistons 88 extending therefrom and secured to the tongs 82. The cylinders are symmetrically located so that they will locate the tongs 82 in proper alignment. The pressure in the positioning cylinders 86 is less than the clamping pressure in the clamping cylinder 84 so as not to affect movement of a course until it is raised at which time they move the tongs 82 into proper alignment.

As seen in Figs. 1, 4 and 5, the tongs 82 of the three pair may be joined by a strip 89 to interconnect the tongs and prevent them from moving out of alignment.

The operation of the crane 10 can best be described by following Figs. 11–17 and referring to the other figures in regard to the switch positions.

The operation of the crane 10 can be controlled either manually or automatically. For manual operation each of the movements from position to position is controlled by the contact buttons located on the switch box 90 at the rear of the supporting structure 11. The movements are the same for both manual and automatic operation and thus the following description of the automatic operation will apply to manual operation as well except that the crane will stop after each movement until the applicable control button is pushed.

The normal at rest or starting position for the transfer crane 10 is with the tongs 82 open, the pickup assembly 41 raised and the carriage 32 directly above the cube 20 nearest the discharge conveyor 14. This position is illustrated in Fig. 11.

The crane is started in automatic operation by pushing a button or by a loaded pallet moving into position for unloading and in so doing contacting a switch (not shown) which starts the crane into operation. This initial switch operates a valve in the pneumatic system which releases the pressure from the bottom of the cylinder 46 and introduces pressure at the top above the piston 44, thus lowering the pickup assembly 41 as shown in Fig. 12. When the pickup assembly 41 reaches the lowered pickup position with the tongs adjacent the first course of units on the nearest cube 20, the group of mounting plate switches 61 engages the contact 64 on the bracket 65. Figs. 9 and 10 show this switch and contact construction. As seen in Fig. 10, there are four switches in the group 61 but only three of them 92, 94 and 95 engage the contact 64. The first switch 92 actuates a valve in the air supply which introduces air to the clamping cylinders 84 to clamp the first course 16 therebetween. The second switch 94 actuates a valve which introduces air into the lower end of the vertical cylinder 46 to raise the pickup assembly 41. The respective valves are of such size that when they are opened simultaneously, as here, air first rushes into the clamping cylinders 84 and clamps the tongs 82 before sufficient pressure has built up in the vertical cylinder 46 to raise the pickup assembly 41. The third switch 95 actuates a stepping relay to a first position.

When the pickup assembly 41 reaches the carrying position, as shown in Fig. 13, the pivotally mounted switch 74 strikes the bottom of the contact 87 and is held thereagainst by the spring 76, so that when the carriage moves away from the contact 87 the switch 74 will resume its initial position. When the crane is raised, the top plate 51 contacts a plunger 97 extending from a micro switch 98 attached to the rectangular frame 34. This switch actuates a valve introducing air to the rear of the drive cylinder 36 thereby advancing the carriage 32 in a forward direction, and in conjunction with the first position of the stepping relay introduces air to the turning cylinder 70 rotating the pickup assembly 41 through 90°, thereby turning the course of brick held by the tongs 82 so as to be in proper position for discharge onto the belt 15. A hydraulic cylinder-piston mechanism (not shown) may be mounted on the front of the supporting structure 11 to engage the carriage 32 and soften the stopping and eliminate undesirable jarring.

When the crane 10 reaches the forward position as shown in Fig. 14, the forward carriage switch 37 engages the contact 83 as does the front pivotally mounted switch 74. The carriage switch 37 reverses the valve which introduced air into the drive cylinder 36 so that the next introduction of air will be at the forward end to move the crane rearwardly, and the pivotally mounted switch 74 actuates the above mentioned valve for lowering the pickup assembly 41.

When the pickup assembly 41 reaches the lower or discharge position as shown in Fig. 15, the tongs 82 hold the course slightly above the moving belt 15. At this point, the group of switches 61 engage a contact 64 positioned similarly to the contact engaged by the switches 61 when in the lowered pickup position. At this point, the second, third and fourth switches of the group 61 engage the contact 64. The second switch 94 actuates the above mentioned valve which raises the pickup assembly. The third switch 95 actuates the stepping relay to a second position which in turn operates a solenoid 101 mounted on a bracket 102 extending to the side of the track 24. The solenoid 101 through a linkage 103 pivots an intermediate stop 104 from the lowered position shown in solid lines in Fig. 6 to a raised position shown in dotted lines in Fig. 6. As will be described below, this stop will be engaged by a switch to stop the crane above the first cube 20 but when in the raised position, as here, the transfer crane is permitted to continue past the intermediate stop 104. The fourth switch 96 actuates a valve which reduces the pressure in the clamping cylinder 84 thereby opening the tongs 82 and dropping the course onto the belt 15. The valves are arranged so that the tongs 82 open before the pickup assembly 41 is raised.

When the pickup assembly 41 reaches the raised position as shown in solid lines in Fig. 16, the top plate 15 once again pushes the plunger 97 so as to actuate the switch 98 to introduce air to the front of the drive cylinder 36 thereby moving the carriage 32 rearwardly. The switch 98 in conjunction with the second position of the stepping relay also actuates a valve which introduces air to the other end of the turning cylinder 70 thereby returning the pickup assembly 41 through the same 90° so as to return the tongs 82 to their initial position.

As the intermediate stop 104 has been raised, the carriage 32 will continue until the rear carriage switch 37 and the rear pivotally mounted switch 74 strike the rear contact 87. This position is shown in dotted lines in Fig. 16. The carriage switch 37 and the rear pivotally mounted switch 74 strike the rear contact 87. This position is shown in dotted lines in Fig. 16. The carriage switch 37 reverses the valves which introduced air into the front of the drive cylinder 36 thereby stopping the crane 10 above the farthest cube 19. The reversal of the valves will permit the subsequent introduction of air to the rear of the drive cylinder 36 for forward motion of the carriage 32 as will be described below. The pivotally mounted switch 74 actuates the lowering of the pickup assembly 41.

When the pickup assembly 41 reaches the lowered position, the same switches are contacted as in the initial lowering and the same operation is performed to clamp the top course of the farthest cube 19 and raise the pickup assembly 41, the stepping relay being moved to a third position which sets up subsequent rotation of the pickup assembly 41.

When the pickup assembly 41 reaches the raised position, the same switches are actuated that were actuated when the pickup assembly was raised after clamping the first course of units, as described above, to move the crane to the discharge position and pivot the pickup assembly through 90° for proper positioning.

The pickup assembly 41 is then lowered at which time the stepping relay is advanced to the fourth position which de-energizes the solenoid 101 permitting the intermediate stop 104 to drop to the lowered position so that the carriage switches 37 and pivotally mounted switches 74 will be contacted to stop the crane above the nearest cube 20. This position of the stepping relay also actuates the piston 22 which raises the pallet 18 one course height so that the second courses are at a proper height for pickup by the crane.

The subsequent operation of the crane to pick up the second course of brick is similar to that described above except that the stepping relay moves through fifth, sixth, seventh and eighth positions which are similar to the first through fourth positions except that the turning mechanism 66 is not actuated, as these second courses are already in position for discharge and require no rotation.

As the normal cube contains 6 courses, it will be seen that 24 stepping relay positions will be required for complete unloading of the pallet. The 8th through 15th positions are identical to the 1st through 7th as are the 16th through 23rd. The 24th position deactivates the switches so that the crane will come to rest in the initial position. At this time, the empty pallet 18 is removed and replaced by another pallet. The advancing of a new pallet may be by any desired means such as by utilizing the system of rollers 21 as broadly illustrated in Fig. 2.

In order to avoid confusion and undue complication, the sources of air pressure have not been shown and only a portion of the connecting hoses are illustrated. Similarly, the electrical wiring for the crane has been omitted to avoid confusion. However, since all of the switches have been described, including their function and operation, it is felt that anyone with a knowledge of electrical wiring could construct the necessary circuits.

From the above description and drawings, it is apparent that the present invention provides a transfer crane which can perform a series of somewhat complicated operations automatically including the pivoting of the objects transferred and the smooth pickup and alignment of objects which are initially out of alignment. The crane has been constructed to perform the delicate operations described above while picking up, transferring and discharging even such heavy objects as a course of 30 structural clay brick, and is capable of operation at the rate of 100,000 standard brick or equivalent in a 400 minute working day.

We claim as our invention:

1. Transfer apparatus having, in combination, a supporting framework, a carriage mounted on said framework to move back and forth along a path between horizontally spaced pickup and discharge positions, means at said pickup position adapted to support objects to be picked up in an alined relation with respect to said path, and clamping mechanism for engaging and picking up objects which are out of alinement without disrupting the objects, the clamping mechanism comprising a pair of oppositely facing mounting cylinders mounted in line on said carriage, a pair of mounting pistons extending from the outside ends of said mounting cylinders, a pair of clamping tongs secured to the outer ends of the mounting pistons and supported on the carriage by the mounting pistons and cylinders on opposite sides of objects on said object supporting means at said pickup position, and means for moving said tongs toward each other to clamp objects therebetween, said tong moving means being mounted between and secured to said tongs for horizontal movement therewith so that, when one tong engages an object before the other tong, said first tong will stop without further movement and said clamping means will move the other tong into clamping position, said mounting cylinders and pistons permitting movement of said tongs under the action of said tong moving means.

2. Transfer apparatus having, in combination, a supporting framework, a carriage mounted on said framework to move back and forth along a path between horizontally spaced pickup and discharge positions, means at said pickup position adapted to support objects to be picked up in an alined relation with respect to the path, and clamping mechanism for engaging and picking up objects which are out of alinement without disrupting the objects, the clamping mechanism comprising a pair of oppositely facing mounting cylinders mounted in line on said carriage, a pair of mounting pistons extending from the outside ends of said mounting cylinders, a pair of clamping tongs secured to the outer ends of the mounting pistons and disposed on opposite sides of objects on said object supporting means at said pickup position, means for moving said tongs toward each other to clamp objects therebetween, said tong moving means being mounted on and between said tongs for horizontal movement therewith so that, when one tong engages an object before the other tong, said first tong will stop without further movement and said clamping means will move the other tong into clamping position, the mounting cylinders having initially equal centering pressures sealed therein which urge the clamping tongs away from each other and, when unobstructed, into a central position with respect to the mounting cylinders.

3. Transfer apparatus having, in combination, a supporting framework, a carriage mounted on said framework to move back and forth along a path between horizontally spaced pickup and discharge positions, means at said pickup position adapted to support objects to be picked up in alined relation with respect to said path, and clamping mechanism for engaging and picking up a course of objects which are out of alinement without disrupting the objects, the clamping mechanism comprising a pair of oppositely facing mounting cylinders mounted in line on said carriage, a pair of mounting pistons extending from the outside ends of said mounting cylinders and movably therein, a pair of clamping tongs secured to the outer ends of said mounting pistons and supported thereby on said carriage on opposite sides of objects on said object supporting means at said pickup position, a pair of clamping tongs secured to the outer ends of said mounting pistons, a pair of clamping pistons secured to said tongs and extending toward each other, a clamping cylinder movably mounted on said clamping pistons, a piston extending into each end of the cylinder, and means of pressurizing both ends of said clamping cylinder to urge the clamping pistons toward each other, said mounting cylinders and pistons permitting movement of said tongs under the action of said clamping cylinder and pistons and the ends of the clamping cylinder being interconnected so that the pressure at the ends remains equal and, when one tong engages an object before the other tong, said first tong will stop and the other tong will be urged into clamping position.

4. The transfer apparatus of claim 3 wherein the mounting cylinders have initially equal centering pressures sealed therein which urge the clamping tongs away from each other and, when unobstructed, into a central position with respect to the mounting cylinders, and the pressure of the clamping cylinder urging the tongs together being greater than the outward pressure of the mounting cylinders.

5. Transfer apparatus having, in combination, a supporting framework, a carriage mounted on said framework to move back and forth along a path between spaced positions, means at one position adapted to support objects to be handled in a predetermined relation with respect to said path, and a clamping mechanism mounted on said carriage and operable to pick up objects on said support and out of said predetermined relation, said mechanism comprising two mounting cylinders each having a reciprocable piston and secured to said carriage with its axis extending longitudinally of the axis of the other cylinder, a pair of clamping members secured individually to the respective pistons of said cylinders and each having an object engaging surface facing longitudinally of said axis of the associated cylinder and toward such surface on the other clamping member, said members moving toward and away from each other with said pistons, and a clamping cylinder with pistons connected to the respective clamping members to support the cylinder on the members and move the members toward each other when pressure fluid is admitted to the cylinder, said mounting cylinders being subjected to pressure fluid to apply a force less than that exerted by said clamping cylinder and pistons to move objects between the members into said predetermined relation.

References Cited in the file of this patent

UNITED STATES PATENTS

| | | |
|---|---|---|
| 1,510,886 | Fuller | Oct. 7, 1924 |
| 1,860,143 | Fuller | May 24, 1932 |
| 2,716,497 | Wahl | Aug. 30, 1955 |
| 2,729,344 | Birchall | Jan. 3, 1956 |
| 2,789,716 | Wolf | Apr. 1, 1957 |
| 2,795,346 | Farmer | June 11, 1957 |